United States Patent
Pötter

(10) Patent No.: US 7,167,825 B1
(45) Date of Patent: Jan. 23, 2007

(54) DEVICE AND METHOD FOR HIDING INFORMATION AND DEVICE AND METHOD FOR EXTRACTING INFORMATION

(75) Inventor: Thomas Pötter, Strother Strasse 13, D-34477 Twistetal-Berndorf (DE)

(73) Assignee: Thomas Potter, Twistetal-Berndorf (DE)

( * ) Notice: Subject to any disclaimer, the term of this patent is extended or adjusted under 35 U.S.C. 154(b) by 0 days.

(21) Appl. No.: 09/936,853

(22) PCT Filed: Mar. 10, 2000

(86) PCT No.: PCT/EP00/02144

§ 371 (c)(1),
(2), (4) Date: Jan. 2, 2002

(87) PCT Pub. No.: WO00/54452

PCT Pub. Date: Sep. 14, 2000

(30) Foreign Application Priority Data

Mar. 10, 1999 (DE) ................................ 199 10 621

(51) Int. Cl.
*G06F 17/27* (2006.01)
(52) U.S. Cl. .................. 704/9; 704/1; 704/4; 704/5; 704/10; 380/42
(58) Field of Classification Search ............... 704/9, 704/1; 380/42
See application file for complete search history.

(56) References Cited

U.S. PATENT DOCUMENTS

| | | | | |
|---|---|---|---|---|
| 5,424,947 A | | 6/1995 | Nagao et al. ........... | 364/419.08 |
| 5,613,004 A | | 3/1997 | Cooperman et al. ........... | 380/28 |
| 5,841,978 A | | 11/1998 | Rhoads ................... | 395/200.47 |
| 5,920,878 A | * | 7/1999 | DeMont ..................... | 715/513 |
| 6,011,849 A | * | 1/2000 | Orrin .......................... | 380/42 |
| 6,496,933 B1 | * | 12/2002 | Nunally ..................... | 713/176 |

FOREIGN PATENT DOCUMENTS

| | | |
|---|---|---|
| DE | 39 26 327 | 8/1989 |
| EP | 268 367 | 5/1988 |
| EP | 525 968 | 2/1993 |
| FR | 2 763 715 | 5/1997 |
| WO | WO 96/42151 | 12/1996 |
| WO | WO 97/18654 | 5/1997 |

OTHER PUBLICATIONS

Smith, J. and B. Comiskey, *Modulation and Information Hiding in Images*, 1996, Verlag Berlin Herdelberg.
Wayner, Peter, *Disappearing Cryptography*, May 1996.

* cited by examiner

*Primary Examiner*—Richemond Dorvil
*Assistant Examiner*—Qi Han
(74) *Attorney, Agent, or Firm*—Michael A Glenn; Glenn Patent Group

(57) ABSTRACT

A device for hiding information in a text comprises a mechanicanism for providing the text, means for linguistically analyzing the text to produce text components, for determining a plurality of formulation alternatives for the text by varying the order of the text components and, optionally, in addition by using synonyms for text components, determining every formulation alternative is grammatically correct for the text and has essentially the same meaning as the text. Certain partial information is allocated to every sequence and/or to every synonym or to every paraphrase.

30 Claims, 4 Drawing Sheets

DEVICE AND METHOD FOR HIDING INFORMATION AND DEVICE AND METHOD FOR EXTRACTING INFORMATION

FIELD OF THE INVENTION

The present invention relates to steganography and in particular to a steganographic concept providing maximum safety such that there is no suspicion of a text containing hidden information.

BACKGROUND OF THE INVENTION AND PRIOR ART

Steganography basically relates to a field of technology in which attempts are made of hiding secrete messages in other messages such that a non-authorized person will not suspect at all that the message presented to him contains a secret message hidden therein. Differently from cryptography, i.e. the encrypting of messages, it is thus possible to obtain efficient protection for secret messages, as a non-authorized person will not suspect at all that a message contains a secret message. In contrast thereto, it can easily be noticed with encrypted messages that these are encrypted. There are many techniques to "break" encryptions. There is agreement in technology that messages encrypted in arbitrary manner can be decrypted with arbitrary expenditure. Thus, the endeavors in cryptography concentrate in particular on making the expenditure for a non-authorized decipherer as high as possible, such that, deterred by the high expenditure, he will refrain from non-authorized decrypting of the encrypted messages. However, under specific circumstances, an expenditure of any degree will be accepted in order to be able to decrypt especially important messages. It is assumed that there are more intelligent, but less complex, methods of "breaking" for many of the known methods of encryption. Such efficient "breaking" cannot be excluded for any of the methods known so far. Steganography is a supplementation in this respect. Steganography—steganography originally means hidden writing—tries to hide secret information in a message in such a manner that nobody will suspect at all that secret information is already hidden therein. In this event, not even the highest expenditure will be of assistance, since a non-authorized person will not know at all which message contains a secret message, especially when he is supposed to monitor large quantities of messages.

Most recently, there has been a great demand for steganographic techniques, as the use of "email" has found ever increasing use, with the applications being no longer in the military field only. In particular, there is a need in companies to electronically transmit information that is to be kept secret. It is self-evident that no unauthorized person should have access to such secret business data by tapping a data line, which e.g. may be part of the Internet. Thus, there is a multiplicity of mail programs encrypting a text prior to mailing thereof. However, as has already been pointed out, there is no safe encryption.

This is why modern steganographic concepts have come into existence most recently. One of these steganographic concepts consists in using, in image files, the last bit or least significant bit of pixels for storing the information to be hidden. Such methods are described in detail by Joshua R. Smith et al., "Modulation and Information Hiding in Images", First International Workshop, Cambridge, UK, May 30 to Jun. 1, 1996, pp. 207–225. Although large amounts of secret information can be hidden in images, this method involves the disadvantage that image files in general are very large files, so that transmission thereof via electronic mail takes a relatively long time. Furthermore, frequent transmission of very large files between a common sender and a common receiver is relatively conspicuous, which is contrary to the steganographic idea as such.

Known methods for hiding information in texts consist in that specific simple predefined sentence structures can be generated, with the grammatical composition of a specific sentence reflecting usually binary information to be hidden. These methods are described in detail by Peter Wayner, "Disappearing Cryptography", Academic Press Inc., 1996, pp. 91–121. Such predefined grammars have the disadvantage that a sender and a receiver, if they desire to communicate secret information frequently, permanently send texts having substantially the same contents or slightly modified meaning contents only, giving rise to the suspicion that secret information is hidden therein.

Known methods of hiding information in texts thus utilize either predefined grammars, which either can generate only simple predefined sentence structures, or are based solely on the alteration of the control characters, space signs and tabulators. Both methods are relatively conspicuous, can be used to a very limited extent only, produce a small bandwidth only, i.e. the amount of information that can be hidden in a specific text is relatively small, and they are not robust with respect to minor changes, such as e.g. reformatting of the text or slight reformulation thereof. Such methods thus are relatively unsuited also for hand-written notes or passages in print media.

In particular, there is a need to distribute secret information to one or more receivers via a newspaper article. Thus, it would be particularly conspicuous if a passage in the newspaper suddenly contained a predefined grammar that becomes conspicuous solely by its contents, unless the grammar accidentally has been matched to the current events of the day.

The technical publication "Techniques for data hiding", W. Bender et al., IBM Systems Journal, vol. 35, Nos. 3 and 4, 1996, pp. 313–336, describes various steganographic concepts. Among other things, possibilities of hiding data in a text are shown, comprising a method for hiding information via manipulation of unused space on the printed page, a syntactic method using e.g. the punctuation marks for hiding information, and a semantic method making use of a manipulation of the words themselves for hiding information. In the semantic method, two synonyms have a primary value and a secondary value allocated thereto. In case of many synonyms, there may be coded more than one bit per synonym. It is deemed problematic in this respect that the desire to hide as much information as possible may collide with the still existing meaning differences between the synonyms. In the syntactic method, the diction and structure of texts is altered, without substantially altering the meaning and mode of speech, respectively. This is achieved in that, if there is a grammatical structure comprising a main clause and a subordinate clause, an information bit is hidden in the text by arranging the subordinate clause in front of the main clause, or arranging the subordinate clause after the main clause. It is deemed problematic in this method that the possibilities of hiding information are limited.

EP 0 268 367 relates to an interface for natural language, which is used for ensuring the semantic correctness of an inquiry. To this end, a text to be analyzed is input into a dictionary analyzer connected to a dictionary of synonyms in order to carry out a synonym substitution, so as to be able to transfer an as small as possible standard vocabulary to a parser connected downstream of the dictionary analyzer. The parser is connected furthermore to a main dictionary and a grammar stage for performing a syntactic analysis of the text input that possibly contains synonyms.

The output of the parser is fed to a simplification stage which has the effect of increasing a recall or a number of hits or a number of the documents delivered back from an inquiry. The simplified inquiry in turn is fed to a translation stage coupled with a database management system capable of producing an output that can function as an interface for a user.

U.S. Pat. No. 5,424,947 relates to a device and a method for analyzing natural language and the construction of a knowledge data base for natural language analysis. A sentence is syntactically analyzed by a parser in order to provide the phrase structure thereof, inclusive of an existing ambiguity. The phrase structure is fed to a dependency analyzer producing on the output side a dependency structure without ambiguity. To this end, a knowledge database is accessed which comprises dependency/taxonym/synonym data and context dependency data. The dependency structure without ambiguity is fed to a system for automatic processing of natural language texts, such as e.g. a machine translation system.

SUMMARY OF THE INVENTION

It is the object of the present invention to make available an improved steganographic concept which is flexible in use and at the same time provides for a high degree of inconspicuousness.

The present invention is based on the finding that the most natural message type for hiding information is text. The usual communication medium does not consist in transmitting images, but in transmitting text messages. For this very reason alone, ordinary text is suited best for hiding information. According to the present invention, the language as such is used for hiding information in a text. Every language contains an extraordinarily high degree of redundancy. This is why many different things can be expressed in a large variety of different ways. Formulation alternatives exist in the form of different sentence positions, different synonyms and different prepositions etc. Certain sentence positions are forbidden due to the rules of grammar and thus would be immediately conspicuous. Thus, only those formulation alternatives are used for hiding information which are admissible (grammatically and lexically). Generally speaking, a text is reformulated in accordance with the information to be hidden, with the information being hidden in the reformulated text. Such reformulated texts will not be conspicuous as they do not comprise artificial elements, but just constitute a different way of expressing specific facts. Persons or programs investigating a multiplicity of messages with regard to the question whether there is secret information contained therein, will not always compile statistics on the usual modes of expression of the author. In this event, greater liberties in reformulation are permissible. If it is assumed that there are such statistics compiled, it is still possible to carry out automatic reformulations maintaining this typical characteristics. Supervisors thus have no possibility of determining whether or not a text has been edited. This is in compliance with the main idea of stenography, which consists in hiding information such that an unauthorized person does not even recognize that messages are hidden at all.

In accordance with a first aspect, the present invention relates to a device for hiding information in a text having at least one sentence, comprising:

means for providing the text;

means for linguistically analyzing the text to produce text components, the text components being components of the sentence and the sentence, in addition to at least one additional component, having exactly one predicate as component;

means for determining a plurality of formulation alternatives for the text
    by varying the order of the text components itself,
    by ascertaining synonyms for the text components and varying the order of the synonyms for the text components, or
    by ascertaining synonyms for at least one text component and varying the order of a synonym for the at least one text component and of another text component of the sentence,
    with every formulation alternative being grammatically correct for the text and having essentially the same meaning as the text, with every sequence and every synonym ascertained having specific partial information allocated thereto;

means for selecting a formulation alternative from the plurality of formulation alternatives in such a manner that the partial information that is allocated to the selected formulation alternative corresponds at least to part of the information to be hidden; and means for outputting the formulation alternative that forms a modified text, with the information to be hidden being hidden in said modified text.

In accordance with a second aspect, the present invention relates to a method for hiding information in a text having at least one sentence, comprising the following steps: providing the text; linguistically analyzing the text to produce text components, the text components being components of the sentence and the sentence, in addition to at least one additional component, having exactly one predicate as component; determining a plurality of formulation alternatives for the text by varying the order of the text components itself, by ascertaining synonyms for the text components and varying the order of the synonyms for the text components, or by ascertaining synonyms for at least one text component and varying the order of a synonym for the at least one text component and of another text component of the sentence, with every formulation alternative being grammatically correct for the text and having essentially the same meaning as the text, with every sequence and every synonym ascertained having specific partial information allocated thereto; selecting a formulation alternative from the plurality of formulation alternatives in such a manner that the partial information that is allocated to the selected formulation alternative corresponds to the information to be hidden; and outputting the formulation alternatives that form a modified text, with said information to be hidden being contained in said modified text.

The "partial information" in a preferred embodiment is constituted by compression symbols which may have binary codes directly associated therewith. The modified text thus has essentially the same sense as the original text. However, this sense is formulated differently in the modified text, with the secret information being contained in the—grammatically correct—formulation.

In accordance with a third aspect, the present invention relates to a device for extracting information hidden in a modified text, the modified text having at least one sentence, comprising:

means for providing the modified text;

means for linguistically analyzing the modified text to produce text components of the modified text, the text components being components of the sentence and the sentence, in addition to at least one additional component, having exactly one predicate as component;

means for producing partial information allocated to the sequence of the text components and, in case the modified text has information hidden in linguistic meanings of the text components, to the linguistic meanings of the text components, said means for producing partial information producing the same partial information which, in hiding the information to produce the modified text, was allocated to the sequence of text components and optionally to the linguistic meanings of the text components;

means for combining the partial information that was produced for the modified text by said means for producing partial information, in order to obtain the information hidden in the modified text; and means for outputting the hidden information.

In accordance with a fourth aspect, the present invention relates to a method for extracting information hidden in a modified text, the modified text having at least one sentence, comprising the following steps: providing the modified text; linguistically analyzing the modified text to produce text components of the modified text, the text components being components of the sentence and the sentence, in addition to at least one additional component, having exactly one predicate as component; producing partial information allocated to the sequence of the text components and to the linguistic meanings of the text components, with the same partial information being produced which, in hiding the information to produce the modified text, was allocated to the sequence of text components and, in case the modified text has information hidden in linguistic meanings of the text components, was allocated to the linguistic meanings of the text components; combining the partial information that was produced for the modified text by said step of producing partial information, in order to obtain the information hidden in the modified text; and outputting the hidden information.

In other words, the device for extracting the secret information analyzes the modified text and extracts the secret information by ascertaining the partial information allocated to the individual formulation alternatives. To obtain sensible extraction, it is of course necessary that the device for extracting knows the allocation of partial information to word position alternatives, synonyms or paraphrases that were used in the device for hiding information. However, it is not necessary that the device for extracting knows the original text that was modified, since the partial information, independently of a text, corresponds to the text components and the sequence thereof, respectively, and is not related to a specific text that always consists of a combination of specific text components.

An essential advantage of the present invention consists in that any natural-language text can be used. The concept according to the invention thus is not limited to predefined grammars and the like. Thus, there is no suspicion arousing communication by way of substantially similar texts.

Another advantage of the present invention consists in that the concept according to the invention is completely insensitive to text formatting. Thus, it would be possible, for example, to print a modified text or even to copy it by hand and to transfer the same in any way to a receiver knowing the grammatical and lexical information of the sender; the receiver just scans the possibly even hand-written notes in order to thus enter the modified text into his device for extraction.

The device according to the invention furthermore is robust with respect to slight modifications of the text as such, e.g. when typing errors are corrected, simple errors in article are corrected, single/plural tense endings are modified, etc.

Depending on the embodiment of the device and method according to the invention, only the sequence of the text components themselves is varied, and there are no synonyms ascertained in order to hide still more information in the text. As an alternative, it is possible to ascertain for all text components synonyms, and in this case the sequence of the synonyms for the text components will be varied instead of the sequence of the text components. Finally, it is possible as well to ascertain synonyms only for part of the text components of the sentence, in order to then vary the sequence of the text components and of the synonyms ascertained for specific text components, respectively.

As will be elucidated in the following, steganographic methods may be employed even in compressing the secret information, which may be combined with methods of textual steganography: either for obtaining higher robustness with respect to changes or easy recognizability of these changes, or for increasing the amount of information that can be hidden. However, if just the sequence of the text components is used for hiding information, reformulations in the sense of other synonyms of course will not affect the success of the device for extraction. However, the bandwidth, i.e. the amount of information that can be hidden in the text, is decreased considerably thereby. Thus, there is a compromise between robustness of the modified text with respect to changes on the one hand and the possible bandwidth on the other hand, with this compromise being decided in accordance with the particular needs of the user.

The information to be hidden preferably is in the form of a binary sequence. To be able to hide this binary sequence in a text, the partial information allocated to the individual alternatives preferably are binary data as well, which may be referred to as code words. Thus, it can be seen that, generally speaking, the device for hiding information basically embodies decoding, with the secret information being decoded so as to form a modified text and the original text determining the coding circumstances or coding vocabulary. Analogously therewith, the device for extracting the information carries out a coding step, with the modified text being coded in a binary sequence in accordance with the partial information as "coding vocabulary" and the binary sequence comprising the extracted secret information.

In this respect, arbitrary coding techniques may be employed of which the technique of arithmetic coding and the technique of Huffman coding are indicated here by way of example only.

An additional advantage of the concept according to the invention consists in that the application thereof is very flexible. For example, if information is to be hidden in a text for providing the text with a watermark, the ascertaining of synonyms generally should be ruled out since the text components themselves contribute to the watermark and substitution of a text component by a synonym possibly could destroy the watermark. If, however, the watermark is introduced into the text by way of the variation of the sequence of the text components themselves, which are unchanged, there is at least a higher probability that the watermark will not be impaired by such modifications of the text.

For watermark applications as special case of steganography, it will be less the amount of information to be hidden that is important, but rather that a watermark will not be suspected at all from the outside. However, if the amount of information to be hidden in the text is of predominant significance, the concept according to the invention can be supplemented by the ascertaining of synonyms, such that, contrary to the known synonym substitution alone, the sequence of the synonyms of all text components or only of a specific portion of the text components is varied. If there is a specific number of synonyms present, the variation of the sequence of the synonyms, in comparison with the mere synonym formation, will considerably increase the amount of information that can be hidden in a text.

A further advantage of the present invention consists in that it is also applicable in cases in which synonym substitution is per se excluded. In order to nevertheless hide information in a text, e.g. in the form of a watermark, only the order or sequence of the components of sentences is varied in accordance with the invention. For the majority of authors and publishers especially in the field of specialized literature, synonym substitution is unacceptable as otherwise technical terms of one specific field could be substituted by alleged synonyms.

The other techniques of steganography mostly are out of the question as well, since they can be eliminated too easily or are noticed too easily. This holds in particular for texts in the so-called "open-ebook" format. Slight variations in the letter positions, as known e.g. for PDF documents, are not possible here since these are plain texts having no microspacing. Thus, the variation of the sentence component sequence according to the invention permits, also in these fields that so far were excluded from steganography, the use of the redundancy of a text for a digital watermark, e.g. for purposes of copyright protection against piracy attacks. With the aid of the present invention, the quantity of the information to be hidden in a text passage first can be increased to such an extent that a watermark becomes sensible. For, it is preferred to store e.g. the complete author ID in every longer paragraph, which normally necessitates a bandwidth of at least two bytes.

BRIEF DESCRIPTION OF THE DRAWINGS

Preferred embodiments of the present invention will be described in detail hereinafter with reference to the attached drawings in which.

DETAILED DESCRIPTION OF THE PREFERRED EMBODIMENTS

Figure 1:
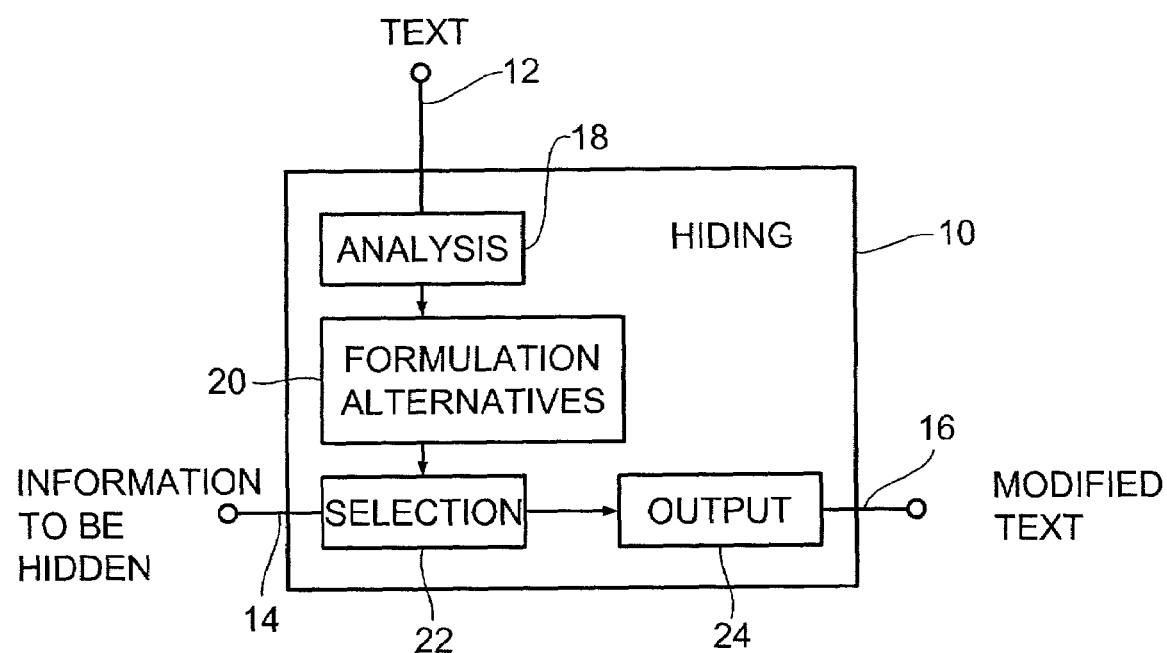
FIG. 1 shows a schematic block diagram of a device for hiding according to the invention.

FIG. 1 shows a block diagram of a device 10 for hiding information in a text according to the invention, with the text being supplied via a text input 12, i.e. means for providing the text. The device 10 for hiding information comprises furthermore a further input 14 for the information to be hidden as well as an output 16 for a modified text which in its meaning corresponds to the original text, but which contains the information to be hidden.

The device 10 for hiding information moreover comprises means 18 for linguistically analyzing the text, in order to produce text components. These text components can be fed to means 20 for determining a plurality of formulation alternatives for the text. Means 22 for selecting a formulation alternative from the plurality of formulation alternatives is arranged to select that formulation alternative the partial information of which corresponds to the information to be hidden. The means 22 for selecting a formulation alternative is followed by means 24 for outputting the formulation alternative that constitutes the modified text, for outputting the modified text at output 16.

In the following, the individual elements of the device 10 for hiding information in a text shall be discussed.

The means 18 for analyzing the text in order to produce text components is arranged to carry out so-called "parsing" method. The means 18 for linguistically analyzing the text preferably is a so-called HPSG Parser (HPSG=Head-driven Phase Structure Grammar). The standard work for realizing the same is Pollard and Sag: "Head driven Phrase Structure Grammar", University of Chicago Press, 1994. In addition to the HPSG parser, there are many other parsers known in technology that may be utilized in the present invention as well. In particular HPSG parsers are modern highly lexicalized, unification-based parsers. Such means preferably operate in the form of sentences. Generally speaking, as will still be explained hereinafter, the text is broken down into its linguistic text components, in which the head of the sentence, which usually is the verb, is determined first in order to determine thereafter other constituents of the sentence, such as subject, complements and adjuncts. The greatest advantages of a unification-based parser for HPSG in comparison with other parsers are (a) that the same specifications for analysis (of an initial sentence) and generation (of the reformulated sentences), (b) that there are about a dozen of parser rules only for each language—everything else is specified in the dictionary in declarative manner, does not require much programming expenditure and can easily be transferred to other languages, (c) that information of different levels/fields (syntax, semantics, pragmatics) can easily be combined. From this results the very close coupling between parser and a dictionary rich in contents, preferably on the basis of the formalism of the typified feature structures. Such a parser provides the syntactic or even the semantic structure of a sentence in the form of a tree or graphic structure. As regards the position in a sentence, words belonging together are identified as such. Information on the constituent sequence (i.e. the sentence position) can be specified in the dictionary directly for head entries together with semantic information, in particular in case of verbs. This serves to exclude many parsing alternatives very early. Parsing alternatives have to be excluded that result in formulation alternatives which are grammatically incorrect. Furthermore, it is decisive for the steganographic concept of the present invention that the modified text has substantially the same meaning as the original text.

Stefan Müller: "Scrambling in German—Extraction into the mittelfeld", Proceedings of the tenth Pacific Asia Conference on Language, Information and Computation, City University of Hong Kong, 1995, describes how to derive for the German language rules or constraints concerning the word position in HPSG systems. Gregor Erbach: "Ambiguity and linguistic preferences" in H. Trost (ed.): Feature Formalisms and Linguistic Ambiguity", Ellis-Horwood, 1993, describes how to allocate probabilities to such word position alternatives in such a manner that they are very close to genuine language usage.

An HPSG parser is a special form of a unification-based parser making use of typified feature structures. An HPSG parser cogently needs dictionary and grammar components for its operation, with dictionaries and grammar constituting a unit; furthermore, there a some few rules, referred to as "schemata", "principles", "lexical rules" in HPSG. Other parsers which require rules only or which do not make use of typified feature structures, but almost optional other data structures, and/or which may or may not consider statistics, may be employed for the present invention as well.

The means 20 for determining a plurality of formulation alternatives for the text may be coupled closely with the HPSG parser. The means 20 preferably consists of two partial components: firstly, a dictionary/grammar stage and secondly, a component for generating the possible sentence position and formulation alternatives from a quantity of rules or constraints that were ascertained before by accessing the dictionary and/or parsing. Substitutions by equivalent phrases can be carried out relatively easily by accessing a dictionary of synonyms, and texts can be compressed very efficiently due to the head-controlled procedure: the predictability for the next data to be compressed thus is very high. In substituting the synonyms, there are two current alternatives: either a full form dictionary is used that contains all common inflected forms. Example: "runs" is synonymous with "goes". In another variation, only basic forms a equated. Example: "to run" is synonymous with "to go". In this case, a morphological component is necessary in addition, which in the example analyzes "runs" as "3rd person singular of to run" and generates "goes" from "3rd person singular of to go". Solutions in this regard are well-known in technology as rule-based morphology, two-level morphology or morphology with finite state quantities.

According to the present invention, the means 20 for determining a plurality of formulation alternatives serves to provide possibilities for the modified text. This can be achieved in particular by varying the sequence or order of the text components and/or by using synonyms for the text components. In the sense of the present invention, a synonym is to be understood not only as a synonym for a single word, but also as a paraphrase and thus as a synonym for a text component, i.e. as a group comprising at least one word. If a text component comprises several words, a paraphrase for this text component may have less or more words, however with the restriction that the sense of the text component is not altered significantly. The degree of similarity or deviation, respectively, can be judged easily if words are allocated to semantic concepts in a semantic hierarchy (i.e. an ontology) and nodes are characterized by weights and edges with the degree of similarity of the associated nodes.

A simple formulation alternative of a sentence consists in that only the sequence of the text components is altered. In most sentences, the grammar permits several different sentence positions. Each sentence position has unequivocal partial information allocated thereto: in a preferred form, this is in the form of symbol codes—as was already outlined in the section concerning synonyms. One approach consists in using the so-called canonical sequence or normal sequence as basis. For example, in the canonical sequence, the subject could be first, followed by the verb which in turn is followed by an adverb followed in turn by possibly existing additional sentence components. An example in this respect is the English language: the sentence position rule "subject-predicate-object" valid here could be one of the canonizing rules for other languages, such as the German language. Any other sentence position then could be coded as $x^{th}$ permutation of this canonical sequence. This concept of the canonical sequence can be generalized: it is sufficient to be able to assign to each sentence position always the same code again—irrespective of the sentence position of the input sentence. The canonical sequence need not be generated for this purpose. Rather, it is sufficient if the information is used with the aid of which this canonical sequence can be generated in principle. In an exemplary realization, this could be a rule system: in each situation, all states arising are uniformly numbered through according to the rules applied. The code for the entire sentence position could be created by concatenation of the codes thus arising for each step of the application of rules. This concatenation in turn can be established in accordance with all variations known from data compression: by arithmetic, bit-wise, byte-wise, word-wise concatenations—possibly along with elimination of redundancies.

It should be pointed out here that the term "sentence" in the sense of the present invention is to be understood to the effect that all grammatical constructions comprising exactly one predicate and at least one additional component, are to be understood as a sentence. Thus, both main clauses and subordinate clauses are each considered to be a sentence in the sense of the present invention, since a main clause, just like a subordinate clause, always has exactly one single predicate and in addition thereto a further component that could be e.g. the subject or the object.

Thus, according to the invention, in contrast to the prior art, not only sentences, i.e. grammatical constructions having exactly one predicate and at least one additional component, are mutually rearranged, but all grammatically acceptable changes in sentence position within such a grammatical construction, such as e.g. a main clause or a partial sentence, can be carried out at the level of the smallest constituents that can be rearranged in grammatically correct manner.

Such smallest constituents that can be rearranged in grammatically correct manner, i.e. components of the sentence, may be article-noun complexes (e.g. the house), article-adjective/adverb/participle-noun complexes (e.g. the beautiful, remote, . . . , brown house), a predicate, a direct object, an indirect object, an adverbial definition (e.g. time, place, circumstances etc.), prepositional phrases (e.g. "in front of the house") as well as pronominal phrases (e.g. of my friend).

The breaking down or linguistic analysis of a sentence into its components, on the basis of the sequence of which information is hidden in the text, can take place recursively by first breaking down the entire sentence and then determining individual constituents for the individual main and subordinate clauses.

By utilizing a common tree structure for the preferably used parse tree of the constituents and of a Huffman tree, there is no need to dynamically construct a further data structure. This saves at the same time storage time and computation time.

Depending on the application, the depth of breaking down, i.e. how many components of a sentence are ascertained and varied in their sequence, is dependent on the amount of information to be hidden in the text. Thus, it is not necessary in every application of the concept according to the invention to break down the sentence into all of its smallest components that can be rearranged. Rather, a rearrangement of the sequence of groups of smallest components within a sentence presumably is sufficient as well.

If the means 18 for analyzing (FIG. 1) and the means 20 for providing formulation alternatives (FIG. 1) are arranged for processing paraphrases, multi-word synonyms can be processed as well. A paraphrase is e.g. the known expression "to throw in the towel". A synonym therefor is the term "to give up". In the sentence "The pupil threw in the towel because of Latin", it is thus already possible to hide at least 2 bits of information by means of the following formulation alternative:

"Because of Latin the pupil gave up".

A first bit is contained here in the synonym "to give up"—"to throw in the towel". The second bit is contained in the position of the sentence part "because of Latin" either in front of or behind the predicate. This example demonstrates that the term "synonym" with regard to the present invention does not only mean "one word for one other word", but also comprises so-called multi-word systems in which a word group by be substituted by one single word or vice versa.

Also adjective, adverbial, prepositional supplements and direct/indirect objects may be mutually rearranged each. Thus, it is not cogently necessary to vary the sequence, for example of the subject in relation to the predicate or of the object in relation to the predicate, if information can be hidden also vial direct/indirect objects or adjective, adverbial or prepositional supplements.

In a preferred embodiment of the invention, that is not only based on variation of the sequence of the text components, but makes use of synonyms as well, the means for determining a plurality of formulation alternatives can access the dictionary/grammar stage in order to ascertain for a word synonyms with the same meaning. Each of this synonyms also has unequivocal partial information assigned thereto, which permits the synonym to be distinguished unequivocally from another synonym. In a preferred embodiment, this partial information is in the form of symbols in the sense of data compression, which directly in the dictionary have or can have bit codes (Huffman coding) or probability intervals (arithmetic coding) allocated thereto.

The means 18 for linguistically analyzing preferably is arranged to produce no text components for which the correctness of the reformulation cannot be guaranteed. Moreover, the means 20 for determining formulation alternatives is arranged to offer only such formulation alternatives for which it is ensured that, in analyzing the same, the same sentence of formulation alternatives can be obtained again. For example, considering the word "Mutter" (meaning in English either mother or threaded nut) in the text to be modified, this term could designate someone's own mother or a threaded nut. If the context is not unequivocally e.g. mechanical engineering, the means for linguistically analyzing in case of this embodiment would not at all provide the text component "Mutter" and would refrain from hiding information to be hidden in a synonym to "Mutter". Analogously therewith, the means 20 for determining plurality of formulation alternatives would not offer "Mutter" as a synonym for a text component, unless the context is unequivocal.

The flexibility of the concept according to the present invention can be matched to the specific user requirements in arbitrary fashion in that the means 20 for determining a plurality of formulation alternatives comprises a specific number of synonym groups. If the number of synonym groups is increased, a larger amount of secret information can be hidden in a given text. Due to the fact that the concept of the present invention, contrary to the prior art, is applicable to arbitrary texts, the means 20 for generating formulation alternatives would have to be capable of making available for any arbitrary word a corresponding number of synonyms in order to obtain a maximum quantity of information to be hidden in a limited amount of text. However, as the number of possible words in a language may become very large, it is unlikely that the means 20 for determining a plurality of formulation alternatives can generate synonyms, or has stored synonyms, for any word. If said means comes across a word for which it has no synonyms, it will simply leave this word unchanged. Of course, the means 20 cannot determine partial information then, either, as there is no partial information available for this word. Thus, this word will not be suited for use for "taking up" information to be hidden. However, investigations have shown that the number of actually used words in general is relatively limited, so that in case of average texts, such as used for example for transmitting business data, synonyms for almost all words appearing in this context can be provided with limited expenditure. Exactly this is a strong point of the present invention, such that, by further incorporation of synonym groups in the means for determining formulation alternatives, the device according to the invention can be "upgraded" in optional manner and thus can be tailored in accordance with the particular field of application and the market requirements. Moreover, it is possible to licence complete dictionaries of synonyms, and there is also a number of methods known for learning synonyms automatically from a large collection of texts.

The means 22 for selecting a formulation alternative from the plurality of formulation alternatives, such that the partial information allocated to the selected formulation corresponds to the information to be hidden, generally speaking works like a decoder or decompression means.

The "vocabulary" for decompressing the information to be hidden, i.e. the information to be hidden, usually has a higher information density than the modified text. Furthermore, there is the fact that synonyms are arranged in groups of as many words as possible with mutually alike or similar meaning—synonym quantities—, so that the selection of a synonym represents an as high as possible information content.

This selection of alternatives is performed by means 22 for selecting and is made available by the means 20 for determining a plurality of formulation alternatives for the text, with the vocabulary according to the present invention being determined in principle by the original text, i.e. the text supplied to input 12, such that, contrary to the prior art which uses just plain predefined grammar structures, optional texts can be used for hiding information. In a preferred modification, the vocabulary for reformulation is determined exactly on the basis of the quantity of synonyms for the words in the original text. An essential characteristic is the reflexivity of the synonym relation: if x is synonymous with y, y is conversely also synonymous with x.

In a preferred embodiment of the present invention, the means 22 operates as arithmetic decoder or decompression means, whereas the same operates as bit-based decoder or decompression means in another preferred embodiment of the present invention. In the latter case, the information to be hidden is treated as binary data. If the information to be hidden is in the form of text data, i.e. characters or figures, these are preferably compressed by means of a usual compression program, with such known compression means in technology already outputting bit data.

In case of the arithmetic version, the alternatives available, which are provided by means 20, are referred to as "context", whereas the same are treated as "dictionary" in case of the bit-based version. These terms are usual in the literature concerned. They both have in common that they consists of pairs based on symbol probability pairs. In case of bit-based coding, the probabilities p are represented by codes of the length of the negative logarithm of two of p "−1d(p)"—each rounded.

To be able to process arbitrary information to be hidden, such that this results in a valid formulation alternative, the partial information allocated to the word position sequences and/or synonyms have to fulfil a specific condition. In a bit-based version, this condition is such that, for the length $l_i$ of the $i^{th}$ alternative as one of n simultaneously possible alternatives, the following condition is fulfilled at all times:

$$\sum_{i=1}^{n} 2^{-l}i = 1.0$$

In a version using arithmetic coding/decoding, the overall sum of the weights of all alternatives has to be known so that the weights can be computed back to probabilities summing up to one.

With respect to arithmetic coding/decoding as well as bit-based coding, the most prominent representative of which is Huffman coding, there is a large amount of literature. By way of example, "Managing Gigabytes" by Witten, Moffat and Bell, Van Nostrand Reinhold, New York, 1994, should be named here. Illustrative examples and information can also be found in "The Data Compression Book", by Nelson and Gailly, M & T Books.

However, for understanding the present invention, the basic idea of arithmetic coding/decoding shall be dealt with. Contrary to Huffman coding, arithmetic coding permits arbitrary matching to the entropy present in a text, whereas in Huffman coding at least one bit per symbol has to be assigned.

Most of the data compression methods continuously match internal statistics during compression, in order to be able to assess the data to be expected as exactly as possible. To this end, each component has a range or weighting allocated thereto, with the width thereof corresponding to the probability. With general coding methods, the overall probability must be smaller than or equal to 1.0. However, for the steganographic coding methods described here, it is cogently necessary that all probabilities/weighting ranges together yield 1.0. Coding is then started. The strong point of arithmetic coding especially consists in that a symbol to be coded may also cover fractions of a fractional digit—i.e. of a bit. The current coder condition is represented by the size of a current interval. In coding additional characters, this interval is increasingly restricted, as in interval interleaving. Thus, generally speaking, one single mantissa of a floating point number is generated which represents a coded or compressed version of the input data to be coded.

In the decoder in turn, the opposite process is carried out. The means 22 for selecting a formulation alternative from the plurality of formulation alternatives begins with an interval from 0 to 1, i.e. the largest possible initial interval. As was already pointed out hereinbefore, the information to be hidden is regarded as one single mantissa of a floating point number. From the bits of this mantissa, as many bits are considered from the beginning each until the number constituted by these bits unequivocally is within one of the probability intervals defined by the partial information determined by the means 20 for determining a plurality of formulation alternatives. The alternative selected thus has an associated, fixedly defined interval. This interval, speaking in illustrative terms, will be scaled again to the width of 1—however, possibly after several steps only. The additional bits of the data stream of the information to be hidden thus may select again one of the alternatives whose probabilities sum up to 1. In practical application, the probability alternatives are managed as integral values which are multiples of the probabilities; the interval does not have to be scaled anew after each decoding step. Rather, the interval boundaries are reduced in a kind of interval interleaving until the accuracy is no longer ensured and new scaling is necessary.

For the purpose of illustration, reference will be made in the following to code trees in connection with Huffman coding. Actually, this would not be realized as a tree, but as a table of prefix-free codes, as it is also known from canonical Huffman coding. This renders possible a higher speed with less storage usage. Such a "code tree" is to be understood as part of a dictionary for bit-based coding. A dictionary contains in addition also the allocation of the symbols to the codes of the "context" or "tree". It is more precise to speak of contexts instead of dictionaries and of tabular contexts instead of trees.

In another embodiment of the present invention, bit-based coding, in particular Huffman coding, is used instead of arithmetic coding/decoding. As is known, a simple Huffman code can be generated by means of a list of symbols/tokens and associated frequencies or probabilities. If each branch of the tree is concluded by a valid Huffman code word, arbitrary information can be coded/decoded provided it can be represented by means of the symbols stored in the code tree. This condition has already been pointed out hereinbefore in general form.

In the event of Huffman coding, which will still be elucidated in more detail hereinbelow by way of an example, the partial information allocated to the individual formulation alternatives, i.e. the sequences of the text components and/or the individual synonyms for the text components, is in the form of Huffman code words. In a usual Huffman code, the text to be coded is first statistically analyzed, with the most frequent sign in a text usually being the space sign or the letter "e". Characters occurring frequently have as short as possible code words allocated thereto, whereas characters occurring very rarely have rather longer code words allocated thereto, however on condition that a complete code tree is formed. As is known for Huffman codes, as great as possible data compression is achieved thereby.

The variety of all grammatically possible sequences of text components thus has Huffman code words allocated thereto, such that the Huffman code words result in a complete code tree for the sequences of text components. The same applies to the individual synonym sentences. Thus, the partial information, i.e. the Huffman code words allocated to a text component and to the synonyms of this text component, in their entirety must result in a valid code tree.

As was already pointed out, the means 22 for selecting a formulation alternative from the plurality of formulation alternatives carries out Huffman decoding. It is fed with the information to be hidden as input signal and advances, in a code context provided by the means 20 for determining a plurality of formulation alternatives, in accordance with the bit sequence of the information to be hidden until a valid code word has been found. Thereafter, the means 22 selects this formulation alternative, such as a specific word position sequence for example. Then, the synonym code context can be used for head, subject, complements, adjuncts of the sentence. However, it is to be noted that the substitution of the synonyms in principle is dependent only on the semantic category and the context information, and not on the word function (subject, head, complement, etc.) Thus, substitution by synonyms in the sequence of the words in the rearranged sentence can be assumed. However, it is often possible to more closely delimit morphological variables, e.g. the case. To this end, the information to be hidden again will serve in bit-wise manner to progress successively in the respective code contexts for the synonyms until a valid code word has been found. This method is continued in a preferred embodiment of the present invention until a sentence, or in a larger scope the entire text, has been completed. In doing so, the information to be hidden was understood as a succession of Huffman code words which were converted to a modified text, i.e. decoded, by means of various code contexts determined by means 20 and in the end by the original text, with said modified text being issued at the output.

In a preferred embodiment, the new word position in the data stream is coded first, and this is followed by the codes for substitution of the synonyms.

The means for determining the plurality of formulation alternatives may be arranged to determine at all times only that one formulation alternative that is selected by the means for selecting on the basis of the information to be hidden. Expressed in exemplary manner by way of a code tree, it is not necessary to follow all branches, but at a node just that branch that finally leads to the code word.

Figure 2:
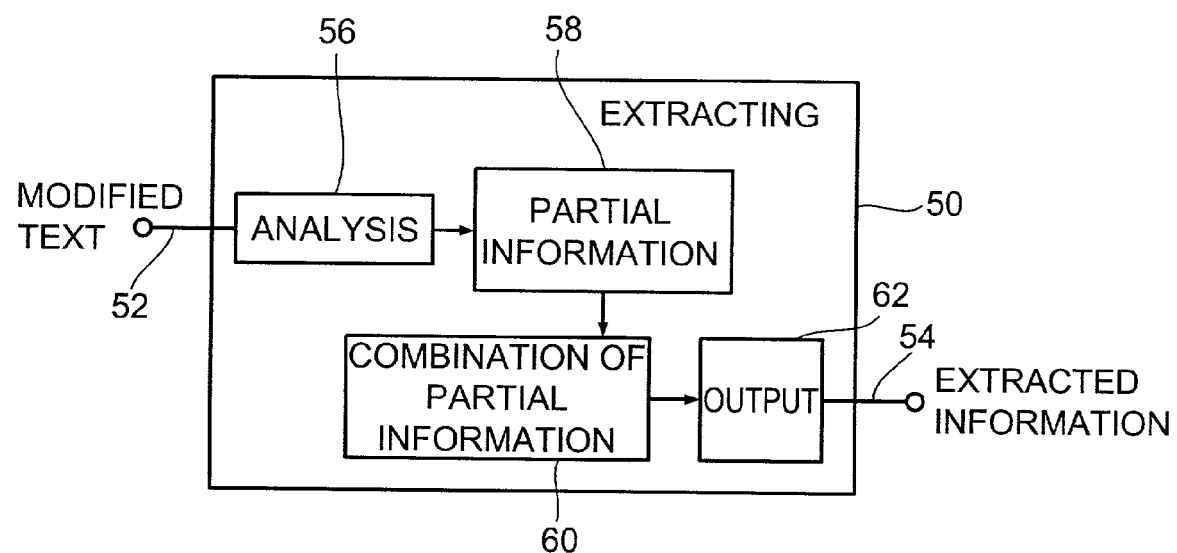
FIG. 2 shows a schematic block diagram of a device for extracting according to the invention.

Before indicating a detailed example for the mode of operation of the device 10 for hiding information, reference should be made to FIG. 2 illustrating a schematic block diagram of a device 50 for extracting information hidden in a modified text. The modified text is supplied to device 50 via an input 52. The extracted information is output via an output 54. Device 50 again comprises means 56 for linguistically analyzing the modified text in order to produce the text components of the modified text. On the basis of this information, the codes for the word position are allocated. The text components are fed into means 58 for providing partial information in order to ascertain the partial information allocated to the text components and/or the order of the text components. To this end, the means 58 has to be able to ascertain the partial information determined by the means 10 for hiding (FIG. 1) at least for the text components determined by the analysis 56. The means 58, just like means 20 of the device for hiding, thus preferably contains the dictionary/grammar stage that can provide the text component sequence and associated partial information as well as synonyms and associated partial information. The preferably bit-shaped partial information that can be reduced to probabilities and is allocated to the modified text, is fed to means 60 for combining the partial information in order to obtain the information hidden in the modified text. Depending on the implementation of the device for hiding, the means 60 for combining the partial information will be designed either as arithmetic coder or as Huffman coder or as a coder of other type in accordance with the coding technique of device 10. The combined partial information finally is fed to means 62 for outputting the hidden information so that the same can be output at output 54. If the information to be hidden are compressed text data, the output device preferably contains a decompression device such that no bit data, but e.g. text data, are output from device 50 for extracting.

In the following, the mode of operation of the device 10 for hiding information will be illustrated in an implementation using Huffman coding/decoding in the selection means 22 and the combination means 60 in device 50 for extracting, respectively. The example sentence reads as follows:

"Das Auto fährt schnell bei glatter Straße über den Hügel." ("The car is running fast on slippery road over the hill.")

The means for linguistically analyzing 18 will break this sentence down into the following partial phrases:

1: Das Auto (The car),

2: fährt (is running),

3: schnell (fast),

4: bei glatter Straße (on slippery road),

5: über den Hügel (over the hill).

It is to be pointed out that the example sentence already is in the so-called canonical sequence (i.e. subject, verb, adverb, prepositional adjuncts, . . . ). The figures in front of the sentence components may be used for short representation of the word position alternatives. For example, "42135" stands for the sentence:

"Bei glatter Straße fährt das Auto schnell über den Hügel." ("On slippery road, the car is running fast over the hill".)

This alternative word position is one of the word positions determined by the means 20 for determining formulation alternatives that is different from the original word position, but which is correct in grammar and provides substantially the same meaning as the original text. Generally speaking, the basic principle in generating the word position alternatives is that the information necessary for generating the correct word position alternatives is stored in any word class, and in particular also in any verb class. For example, the sequence of the constituents in the subject, complement and adjunct attributes of the respective lexical entries can be defined in a dictionary/grammar stage with respect to the respective classes. The means for determining a plurality of formulation alternatives, which preferably is in the form of an HPSG system as well, then is capable of generating the following word position alternatives in rule-based manner (indicated in parentheses thereafter are canonical Huffman code words for the individual text components):

12345 (111), 12435 (110), 32145 (1001), 32154 (1000), 34215 (0111), 35214 (0110), 42135 (0101), 45213 (0100), 45231 (0011), 52134 (0010), 54213 (0001), 54231 (0000) (13 word position alternatives).

The binary sequences behind the individual word position alternatives represent the partial information allocated to the particular word position alternative. It can be seen that a code context with 13 code words is used here, with three word position alternatives having a code word with a length of 3 bits, whereas the remaining 10 word position alternatives have a code word with a length of 4 bits.

Analogously therewith, the provision of a plurality of formulation alternatives for the text is carried out by using synonyms for the text components. In the following, there are shown synonyms, and canonical Huffman code words in parentheses therebehind, for the individual text components.

car (111), motorcar (110), motor vehicle (101), auto (100), limousine (011), private car (010), passenger car (0011), automobile (0010), vehicle (00011), jalopy (00010), rattletrap (00001), conveyance (00000) (12 synonyms)

is running (11), rolling (10), moving (01), speeding (001), traveling leisurely (0001), dashing (0000) (6 synonyms)

fast (111), like lightning (110), quickly (101), rapidly (1001), as swift as an arrow (1000), as fast as a comet (0111), as fast as lightning (0110), swiftly (0101), as fast as an arrow (0100), in a hurry (0011), at breakneck speed (0010), apace (00011), hurriedly (00010), hastily (00001), speedily (00000) (15 synonyms)

on (1), at (0) (2 words with similar sense in this context only)

slippery (11), skiddy (10), iced up (011), slippery as ice (010), icy (0011), slippy (0010), greasy (0001), slick (00001), slimy (00000) (9 synonyms)

road (11), roadway (10), main road (011), country road (010), trunk road (0011), paved road (0010), road passable for vehicles (0001), lane (0000) (8 synonyms)

hill (11), mountain (10), elevation (011), rise (0101), mountain chain (0100), eminence (0011), ridge (0010), gradient (00011), height (00010), hillock (00001), hummock (00000) (11 synonyms).

It can be seen again that every synonym class forms a code context of its own such that 7 synonym code contexts result for the example sentence in which, for arbitrary other text components for arbitrary other example sentences, corresponding code contexts can also be produced dynamically by the means for determining a plurality of formulation alternatives or retrieved from a memory, respectively. In a preferred realization, such a memory is coupled with a dictionary or thesaurus.

It can be seen from this example that frequently expected or used synonyms preferably are given shorter codes than synonyms expected less frequently. Moreover, it can be seen that, if one of the terms of this list of synonyms comes up, exactly all of these terms of the list must be generated as synonyms so that a complete code tree is present. In the instant case, if the term "vehicle" comes up, thus only the exact car synonyms would have to be generated, but not such terms as e.g. "truck, motorcycle etc.". For such effects, there may be provided a similarity threshold value which serves to eliminate a change in meaning which would arise if the term "car" were replaced by "truck".

The following bit sequence representing the information to be hidden:

0010/0011/001/0101/0/10/0101 would code the sentence

"Über die Anhöhe rast der Pkw blitzschnell auf eisglatter Fahrbahn."

(Over the rise, the passenger car is speeding as fast as lightning on icy roadway.")

The original sequence without change in the position of the text components would read as follows: "Der Pkw rast blitzschnell auf eisglatter Fahrbahn über die Anhöhe" (The passenger car is speeding as fast as lightning on icy roadway over the rise"). This would correspond to the binary part without the prefix for the word position, which reads as follows in bit representation:

0011/001/0101/0/10/0101

It is to be pointed out that the diagonals in the bit representation for the information to be hidden are provided for optical reasons only. There is no such coding in practical application. Articles and capital/small letters are set by the means 20 for determining a plurality of formulation alternatives in accordance with the particular requirements. As regards the preposition "über" (over), there is no synonym here. Therefore, it is left unchanged.

It is to be pointed out that really any bit sequence, if it is not too long, generates a valid sentence with similar meaning. For example, if the 10th bit, i.e. the second "0" in symbol 001 for "speeding" is eliminated, the term obtained instead is "moving", i.e.: "Über die Anhöhe bewegt sich der Pkw blitzschnell auf eisglatter Fahrbahn fort." (Over the rise, the passenger car is moving as fast as lightning on icy roadway).

If the 15th bit, i.e. the last "1" in symbol 0101 for "as fast as lightning" were eliminated, the bit sequence remaining in the data stream for selection of the adjective is 0100100101. Due to the fact that a symbol 010 does not exist in this context as the codes are prefix-free, a bit has to be added for selection of the adjective. In this case, symbol 0100 is selected, standing for "as fast as an arrow". Then, there is 100101 left in the data stream. The first 1 selects "on" instead of "over" as in the example with one 1 in addition. There is then 00101 remaining in the data stream; in this case the symbol 0010 is selected first, standing for "slippy". Finally, there is one single 1 left in the data stream to be hidden. This could be used either for selecting "road" (11) or "roadway" (10). This selection is completely free. Thus, the bit sequence 0010/0011/001/0100/1/0010/1x generates the sentence "Über die Anhöhe rast der Pkw pfeilgeschwind bei rutschiger Straße" (over the rise, the passenger car is speeding as fast as an arrow on slippy road), with x having been set in arbitrary manner as 1. This bit sequence differs from the original sequence just in that the original 15th bit is missing here.

Differently from the embodiment described, simple Huffman coding using trees could be utilized instead of canonical Huffman coding as well. However, canonical coding permits considerably more efficient decoding by looking up in tables on the basis of the first code word bit and by restriction to just a few efficient additive/subtractive operations. Canonical Huffman coding is known in technology as well.

It was pointed out hereinbefore that shorter code words may have assigned thereto a more common sentence position or a more common synonym alternative. It is presumed in this regard that shorter code words occur more frequently in a data stream of information to be hidden, which is why the more common alternatives or synonyms are selected more frequently.

Figure 3:
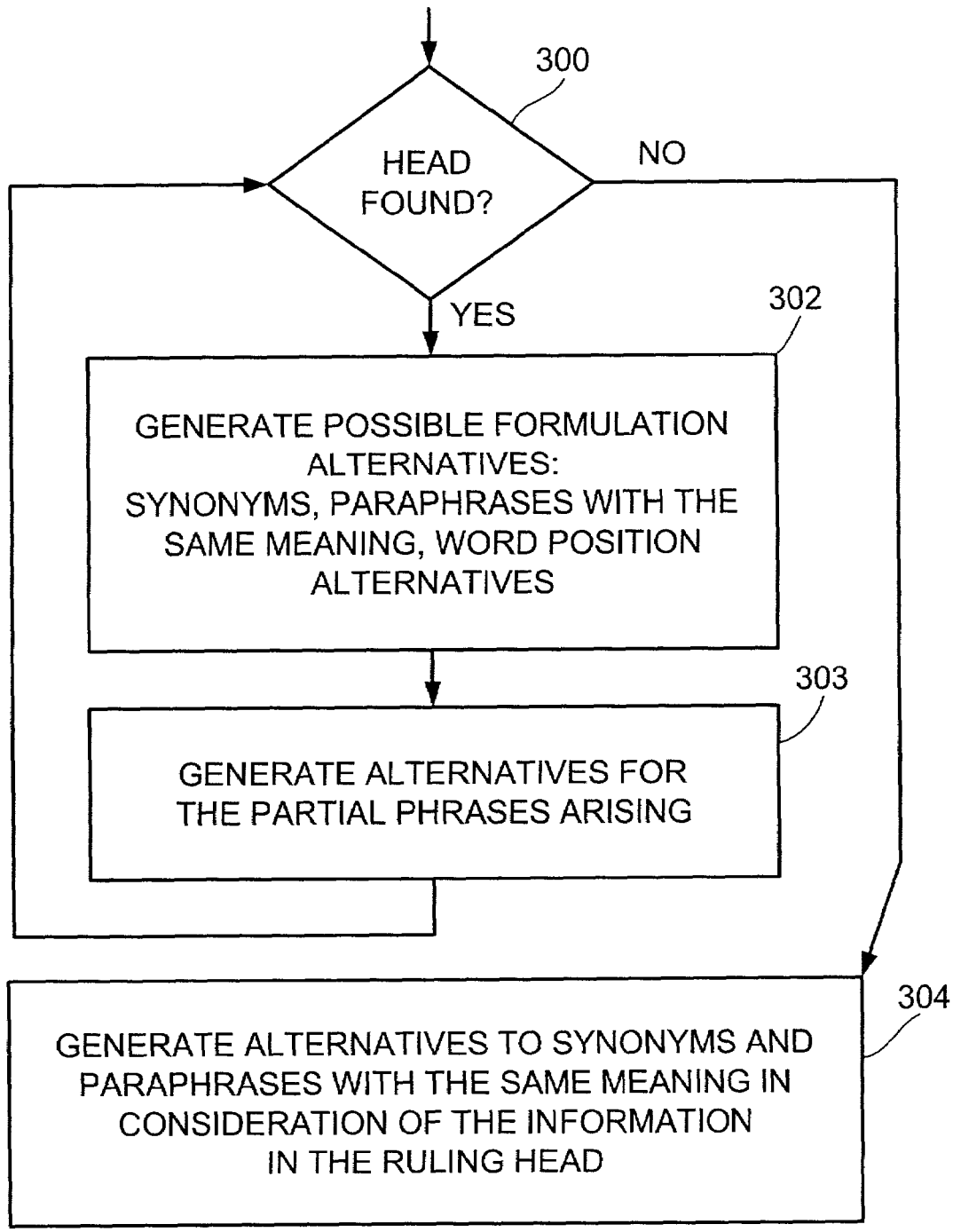
FIG. 3 shows a flow chart for alternative generation for a phrase according to a preferred embodiment of the present invention.
Figure 4:
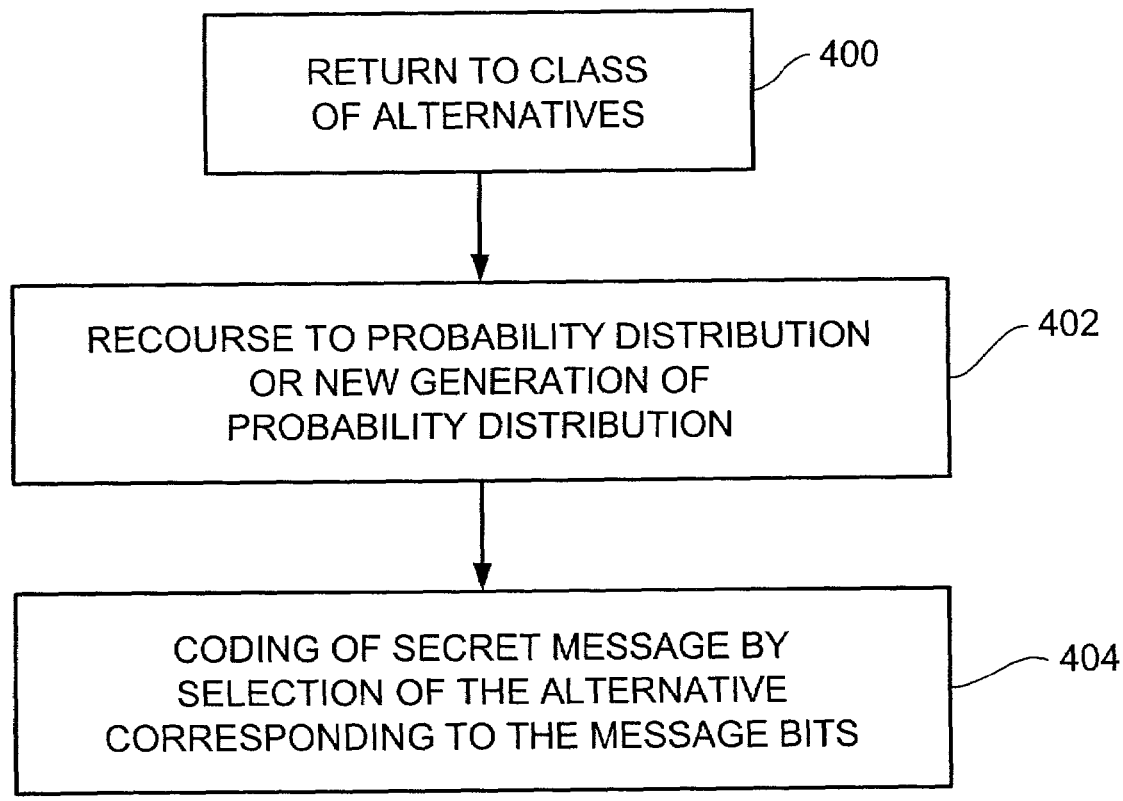
FIG. 4 shows a flow chart to illustrate the handling of individual alternatives according to the present invention.

In the following, reference will be made to FIG. 3, schematically illustrating the method employed for determining a plurality of formulation alternatives for the text. This case illustrates in exemplary manner the generation of alternatives for a phrase in accordance with the HPSG idea. At first, in a step 300, the head of a sentence is searched. This is as a rule a finite verb, the predicate. A dictionary entry in the dictionary/grammar stage concerning this verb then says what kind of complements and which subject the verb does admit. Partly, there may also be adjuncts or idiomatic phrases indicated in the entry in the dictionary. Both syntactic and semantic information may be recorded in the dictionary or inferred by means of (lexical) rules. For example, there may be recorded for a word (subject, complement or adjunct) whether this concerns a living being, a human being, an animal, an object, an abstract term, etc. Information on possible word position alternatives possibly may already be retrievable here. In the ideal case, the probabilities for all conceivable alternatives can be derived from the lexical information, as indicated in step 302. From these probabilities, there is produced the partial information allocated to every formulation alternative, i.e. to every synonym and every word position alternative. It is thus possible to look for synonyms to the head of the phrase, i.e. of the text, to look for expressions with the same meaning or to set up word position alternatives. FIG. 4, which will be dealt with in more detail further below, illustrates a detailed explanation of step 302.

The lexical information of the head restrict the possibility for the remaining elements of the sentence. Within these partial phrases or text components, there is again searched a head, as indicated in step 303. This can be e.g. a preposition within a prepositional phrase or a verb in a subordinate clause. The process continues in recursive manner. It is thus possible to generate word position alternatives as soon as the analysis of the sentence has proceeded far enough. If there was no head found in step 300, either because there is none or because there are difficulties arising in the linguistic analysis or parsing, it is still possible after all to generate symbols and to replace fixed expressions by expressions with similar meaning (step 304).

In generating a plurality of formulation alternatives it has to be born in mind in principle that all formulation alternatives for the text are correct in grammar and have substantially the same meaning in the same context in consideration of the similarity threshold, such that the modified text is not conspicuous in a manner that secret information can be suspected therein.

FIG. 4 illustrates the treatment of an individual alternative i. Every alternative first is returned to its class of alternatives (step 400). This may be, for example, the class of the correct word position or order for this sentence or the semantic class to which a word belongs. In a step 402, recourse is taken either to an existing probability distribution, i.e. to the already existing partial information, or a probability distribution, i.e. partial information, can be generated in accordance with specific rules that are known to the device for extracting information (FIG. 2) as well. There is no new generation necessary if the similarity threshold value indicated by the user is so low that it is not greater than the minimum distance between the respective current semantic concept group and the adjacent semantic concept group. If the similarity threshold value is higher, all semantic concept group whose distance to the core semantic is lower than this threshold value should be combined in a semantic group. A preferred method of computing semantic similarity in taxonomies was presented in Jay J. Jiang and David M. Conrath (1997), "Semantic similarity based on corpus statistics and lexical taxonomy", in Proceedings of International Conference Research on Computational Linguistics (ROCLING X), Taiwan.

Basically, the weights of all participating elements are just summed to a total weight in order to conclude therefrom the probabilities and thus the partial information of the individual alternatives. In doing so, the weights belonging to a remote semantic group should be scaled down correspondingly. A rapid, but inaccurate variant consists in reserving, in accordance with a rough estimate, probability or code ranges for the alternatives that are part of a semantic group.

If the means 22 for selecting (FIG. 1) makes use of arithmetic coding/decoding, an interval for every semantic group can be reserved without any loss in accuracy, which results from the total sum of the weights present there, scaled down in accordance with the remoteness of the concepts. In case of a bit-based selection means 22, a code range, e.g. all codes starting with "110", could be reserved for the remote semantic group. A step 404 demonstrates the function of the selection means 22, i.e. coding of the secret message by selection of the alternative corresponding to the message bits. Thereafter, the process continues with the next alternative i+1.

If several secret messages, i.e. several items of information to be hidden, are to be introduced into the text, there is typically introduced a preamble into the stream prior to the beginning of the first secret information; this preamble codes the number of the secret data sources existing as well as the bit positions of its beginning in the data stream. Typically, each secret data source is coded with a different key and provided with control information. In decoding, the user then is asked for the key/keys, and only that secret part is decoded that matches the key. Whether the key matches, in turn, can be concluded from the control information or from the decoded data itself. If the decoded text, i.e. the text at the output of extraction device 50, is to be a text making sense and this is not the case, the key was wrong.

In a more complex implementation of the present invention, the user can take more specific influence on the generation and selection of the alternatives, for example by indicating which words should be avoided, e.g. to exclude especially obsolete synonyms, whether the modified text is to be of minimum, medium or maximum sentence length, whether the new text is to have a certain language complexity or a specific language level, such as e.g. higher, simple, colloquial, historic etc., which syntax models and word position models are preferred, whether the text is to be altered as much as possible, whether attempts are to be made of enhancing the readability of the text, which list of words is to be substituted by other words on principle, and how presumed errors are to be handled, for example by way of automatic correction, interactive correction or whether the errors should be ignored on principle. However, a prerequisite for this is at all times that, as repeatedly mentioned, the grammar can be rendered correctly, i.e. that in particular inflected verb forms are matched. Such options typically are coded into the information to be hidden at the beginning of the data stream or in an external coding level. It is advantageous to employ short compressed symbols each for coding a typical sentence of configuration data.

The end of the secret data stream, in the general event of data compression, can be coded in several ways, on the one hand by explicit storage of the bit length in the preamble of the data to be compressed or by coding a variant with the meaning "end of secret data stream". To render the latter variant possible, however, such a symbol would have to be coded explicitly in every context. However, this causes an increase in entropy and thus the length of the compressed data. In the event of the coding operation for hiding secret information, this second variant is not possible anyway: a bit sequence in the secret data stream could select the end symbol prematurely and thus cause coding of erroneous information.

In a preferred embodiment of the present invention, the means 20 for determining a formulation alternative (FIG. 1) and the means 58 for providing partial information (FIG. 2), respectively, makes use of a word memory in the form of a tree, e.g. a trie (a tree data structure for letters, derived from "information retrieval"), or preferably a graph, consisting (a) of full word forms, i.e. inflected words, which then are correlated with other inflected words, or (b) of morphologically syntactic analyses of the words, e.g. according to inflection classes, and in particular splitting into word prefixes, radices and suffixes, in which only the word radixes or word prefix/word radix combinations explicitly have to be correlated as synonyms and the respective inflected forms are analyzed in accordance with the current demand with the particular word present on the basis of inflection data, and are generated correspondingly for a selected synonym.

Synonym references in this regard are organized (a) as chain of synonymous meanings of a word which firstly make reference to each other in ring-like or loop-like manner and secondly are ordered implicitly by an order regulation, such as the lexical sequence or arrangement in accordance with the probability of occurrence or explicitly by characterization of the rank of one or more elements, or (b) as group of words considered to be synonymous or as references to the synonyms with the property that reference is made inversely to this group from the synonyms concerned as well or that this group is stored as value of a synonym.

It is to be pointed out that an HPSG parser is particularly well suited for use with the concept according to the invention since it can also be used to tackle the problem of ambiguity in case of rearrangement of components of the sentence. This will be illustrated by way of the following example sentence, which reads as follows:

"Er sieht den Mann auf dem Berg mit dem Fernglas." (He sees the man on the mountain with the binoculars.)

The sentence has basically four correct meanings, consisting in that "he" or "the man" is "standing on the mountain" or has "binoculars". In contrast thereto, the similar sentence "Er sieht den Stern auf dem Berg mit dem Fernglas". (He sees the star on the mountain with the binoculars.)

has only one correct meaning. Due to the semantic characteristics of "star", and in particular due to the size ratios with respect to other objects, the HPSG parser can determine, due to its inherent hierarchic tree structure, that a star cannot stand on a mountain and cannot have binoculars, either.

Other methods for reducing ambiguities, which are also referred to as rendering disambiguous, are of statistic and/or rule-based nature. Such methods can be utilized either instead of an HPSG parser or in supplementation to an HPSG parser. These methods are based on dictionaries with contexts through which a large amount of potential ambiguities is correctly resolved. Such dictionaries often are prepared manually or semi-automatically. The devices and methods of the present invention easily can resort to such already existing dictionaries. Due to the words occurring or due to the grammatical structures occurring, statistic or rule-based laws then are preferably determined automatically with the use of such dictionaries.

A distortion in meaning by varying just the sequence of the text components thus is not as likely as in case of the use of synonyms. According to the invention, however, care is taken here too in the sense of the basic concept of steganography that, in addition to the grammatical correctness, no or no too large changes in sense occur due to the hiding of the information. Thus, there are basically employed formulation alternatives of identical sense. If this is not possible in a concrete case or if the number of the then possible formulation alternatives is too little, attempts will always be made to ensure a slight deviation, that is within a certain scope, in the meaning contents of the formulation alternatives. If this is not possible for a specific sentence, no information will be hidden in this sentence, but rather this sentence is left out.

The invention claimed is:

1. A device for hiding information in a text having at least one sentence, comprising
    means for linguistically analyzing the text to produce linguistic text components, the linguistic text components being components of the sentence and the sentence, in addition to at least one additional linguistic text component, having exactly one predicate as a linguistic text component;
    means for determining a plurality of formulation alternatives for the text, wherein the means for determining is operative to determine the plurality of formulation alternatives
        by varying the order of the linguistic text components itself,
        by ascertaining synonyms for the linguistic text components and varying the order of the synonyms for the linguistic text components, or
        by ascertaining synonyms for at least one linguistic text component and varying the order of a synonym for the at least one linguistic text component and/or another linguistic text component of the sentence,
    wherein the means for determining is adapted to generate the formulation alternatives such that every formulation alternative is grammatically correct for the text and has essentially the same meaning as the text, and that every order of linguistic text components and every synonym ascertained have specific partial information allocated thereto,
    wherein the partial information allocated to the simultaneously possible formulation alternatives for a sentence result in an overall probability of 1.0 such that arbitrary information can be hidden in the text,
    wherein the means for determining is operative to use, for the allocation of partial information to the simultaneously possible formulation alternatives, an existing probability distribution or a probability distribution generated in accordance with specific rules known to a device for extracting hidden information from a text;
    means for selecting a formulation alternative from the plurality of formulation alternatives in such a manner that the partial information that is allocated to the selected formulation alternative corresponds at least to a part of the information to be hidden; and
    means for outputting a selected formulation alternative forming a modified text, with said information to be hidden being hidden in said modified text,
    wherein the means for linguistically analyzing includes a parser, wherein the parser is operative to recursively break down the sentence into the text components using a hierarchical tree structure, wherein the parser is further operative to determine the predicate and remaining elements of the sentence and to recursively search a linguistic head within the remaining elements of the sentence until the text components of the sentence are obtained,
    wherein the parser includes a dictionary/grammar stage having an entry for the predicate or the linguistic head,
    wherein the means for determining is operative to use the entry for the predicate and the linguistic head to exclude parsing alternatives resulting in grammatically incorrect formulation alternatives, and wherein the means for determining is operative to leave a sentence unchanged when valid formulation alternatives can not be found.

2. A device according to claim 1,
wherein the means for linguistically analyzing is a parser, in particular a highly lexicalized, unification-based parser and specifically an HPSG parser.

3. A device according to claim 1,
wherein the means for determining a plurality of formulation alternatives is arranged to output only that formulation alternative from the plurality of formulation alternatives that is selected by the means for selecting on the basis of the information to be hidden.

4. A device according to claim 1,
wherein the dictionary/grammar stage has stored therein synonyms for linguistic text components as well as unequivocal partial information for each synonym, as the partial information including syntactic, semantic, contextual and statistic information.

5. A device according to claim 1,
wherein each sequence of the linguistic text components and each synonym ascertained has a weighting allocated thereto as partial information, said weighting being determined such that all weightings for the sequence and the synonyms together, respectively, yield a probability of 1, and
wherein the means for selecting is arranged to select one formulation alternative each in accordance with the rules of arithmetic decoding, controlled by the secret data that are understood as coded data.

6. A device according to claim 1,
wherein the partial information is in the form of Huffman code words, wherein the following equation holds:

$$\sum_{i=1}^{n} 2^{-li} = 1.0$$

in which li is the length in bit of the $i^{th}$ Huffman code word and n is the number of Huffman code words of a context, wherein all synonyms for a linguistic text component, inclusive of the linguistic text component, together constitute a context of their own, wherein all different sequences of linguistic text components, inclusive of the sequence of the linguistic text components in the text, constitute a context of their own, such that any arbitrary information to be hidden constitutes a stream of valid Huffman code words.

7. A device according to claim 5,
wherein the information to be hidden comprises a bit sequence, wherein the means for selecting is arranged to take as many bits from the beginning of the bit sequence until the number constituted by these bits is unequivocally within a specific one of the probability intervals determined by said weightings, whereupon said means for selecting selects that formulation alternative that corresponds to the weighting allocated to the specific probability interval, whereupon said means for selecting carries out additional interval interleaving in order to select the next formulation alternative.

8. A device according to claim 6,
wherein the means for selecting is arranged to perform Huffman decoding, said means successively accessing various Huffman code contexts selected by the linguistic text components from a number of formulation alternatives provided by said means for determining a plurality of formulation alternatives, with the input to Huffman decoding being the information to be hidden and with the output from Huffman decoding being the modified text.

9. A device according to claim 1,
wherein each linguistic text component comprises at least one word, and wherein the synonyms for each word are stored in the dictionary/grammar stage together with the corresponding partial information, whereas the partial information for each different sequence of linguistic text components is predetermined in accordance with modelling of real linguistic laws by declarative rules, constraints or fixed implementations in software.

10. A device according to claim 9,
wherein the means for selecting is arranged to utilize a first section of the information to be hidden for the selection of the sequence of the linguistic text components and the subsequent sections for the selection of the synonyms, and wherein the sequence of the selected synonyms is a sequence selected from one or several linguistically possible sequences and is independent of the sequence of the linguistic text components in the text.

11. A device according to claim 1, further comprising:
means for encrypting or for compressing the information to be hidden, whereby encrypted and/or compressed information to be hidden is produced which is adapted to be fed to said means for selecting.

12. A device according to claim 1,
wherein the means for linguistically analyzing is arranged to deliver no linguistic text components for which the correctness of the reformulation cannot be guaranteed and/or wherein the means for determining formulation alternatives is arranged to offer only such formulation alternatives for which it is ensured that the analysis thereof can yield again the same sentence of formulation alternatives.

13. A device according to claim 1,
wherein there is public text and secret data, the device comprising a control means arranged to supply the information of the secret data to said means for selecting, such that the same are hidden in the public text by modification of the public text.

14. A device according to claim 13,
wherein the statistics used for compression or encryption are dependent on the public text so that conformities of data fragments in the public text and the secret data are utilized for efficient compression.

15. A device according to claim 1,
wherein the means for determining the formulation alternatives is controllable via the partial information in order to maintain a specific style, in particular to prefer or exclude certain formulation alternatives, the certain formulation alternatives including at least one of certain words, specific lengths of sentences, the kind of language complexity, the language level, the kind of syntax and word position models, the perspective of narration, the ethnic focus with respect to the origin of the words the modified text is supposed to have, which list of words to be avoided should be used, how presumed errors in the text are to be handled and whether new errors may be built in.

16. A device according to claim 1,
wherein the means for determining is operative to have a predetermined similarity threshold, and wherein the means for determining is operative to determine similar formulation variants for the text, when semantic differences of the formulation alternatives with respect to an original alternative are above the similarity threshold, and wherein the means for determining is operative to reject formulation alternatives having semantic differences with respect to the original alternative which are below the similarity threshold.

17. A device according to claim 15, wherein the amount of text is limited, with the similarity threshold being dimensioned such that just the entire information to be hidden can be accommodated in the limited amount of text.

18. A device according to claim 1, wherein the means for determining a plurality of formulation alternatives is arranged to dynamically determine the formulation alternatives and to dynamically produce the partial information allocated to each formulation alternative.

19. A method for hiding information in a text having at least one sentence, comprising:

linguistically analyzing the text to produce linguistic text components, the linguistic text components being components of the sentence and the sentence, in addition to at least one additional component, having exactly one predicate as a linguistic text component;

determining a plurality of formulation alternatives for the text
  by varying the order of the linguistic text components itself,
  by ascertaining synonyms for the linguistic text components and varying the order of the synonyms for the linguistic text components, or
  by ascertaining synonyms for at least one linguistic text component and varying the order of a synonym for the at least one linguistic text component and of another linguistic text component of the sentence, with every formulation alternative being grammatically correct for the text and having essentially the same meaning as the text, with every order of linguistic text components and every synonym ascertained having specific partial information allocated thereto, wherein the partial information allocated to the simultaneously possible formulation alternatives for a sentence result in an overall probability of 1.0 such that arbitrary information can be hidden in the text, wherein, for the allocation of partial information to the simultaneously possible formulation alternatives, an existing probability distribution or a probability distribution generated in accordance with specific rules known to a device for extracting hidden information from a text is used;

selecting a formulation alternative from the plurality of formulation alternatives in such a manner that the partial information that is allocated to the selected formulation alternative corresponds to the information to be hidden; and outputting the formulation alternatives that form a modified text, with said information to be hidden being contained in said modified text, wherein the step of linguistically analyzing includes a step of parsing by recursively breaking down the sentence into the linguistic text components using a hierarchical tree structure, by determining the predicate and remaining elements of the sentence and by recursively searching a linguistic head within the remaining elements of the sentence until the text components of the sentence are obtained, wherein the step of parsing furthermore using a dictionary/grammar stage having an entry for the predicate and the linguistic head, wherein the step of determining comprises using the entry for the predicate and the linguistic head to exclude parsing alternatives resulting in grammatically incorrect formulation alternatives, and wherein the step of determining leaves a sentence unchanged when valid formulation alternatives can not be found.

20. A device for extracting information hidden in a modified text, the modified text having at least one sentence, comprising:

means for linguistically analyzing the modified text to produce linguistic text components of the modified text, the linguistic text components being components of the sentence and the sentence, in addition to at least one additional component, having exactly one predicate as a linguistic text component;

wherein the means for linguistically analyzing includes a parser, wherein the parser is operative to recursively break down the sentence into the text components using a hierarchical tree structure, wherein the parser is further operative to determine the predicate and remaining elements of the sentence and to recursively search a linguistic head within the remaining elements of the sentence until the text components of the sentence are obtained, wherein the parser includes a dictionary/grammar stage having an entry for the predicate and the linguistic head, wherein the means for determining is operative to use the entry for the predicate and the linguistic head to exclude parsing alternatives resulting in grammatically incorrect formulation alternatives, and means for producing partial information allocated to the sequence of the linguistic text components and, in case the modified text has information hidden in linguistic meanings of the linguistic text components, to the linguistic meanings of the linguistic text components, said means for producing partial information producing the same partial information which, in hiding the information to produce the modified text, was allocated to the sequence of linguistic text components and optionally to the linguistic meanings of the linguistic text components, wherein the partial information allocated to the simultaneously possible formulation alternatives for a sentence result in an overall probability of 1.0 such that arbitrary information can be hidden in the text, wherein the means for producing is operative to use, for the allocation of partial information to the simultaneously possible formulation alternatives, an existing probability distribution or a probability distribution generated in accordance with specific rules known to a device for extracting hidden information from a text, wherein the means for producing is operative to not produce partial information from a sentence when valid formulation alternatives can not be found by the means for linguistically analyzing, means for combining the partial information that was produced for the modified text by said means for producing partial information, in order to obtain the information hidden in the modified text; and means for outputting the hidden information.

21. A device according to claim 20, wherein the partial information is in the form of weightings, with said means for combining the partial information carrying out arithmetic coding for extracting the hidden information.

22. A device according to claim 20,
wherein said partial information is in the form of simple or canonical, in particular prefix-free, Huffman code words, wherein said means for combining the partial information is operative to carry out Huffman coding, in which code contexts used for Huffman coding are selected by said means for producing and correspond to the code contexts that were utilized when hiding information.

23. A device according to claim 20,
wherein the partial information that was used in hiding first relates to the sequence of the linguistic text components and thereafter to the synonyms of the linguistic text components in a predetermined sequence, and wherein said means for combining the partial information is arranged to derive from the sequence of the linguistic text components of the modified text firstly the partial information relating to the sequence and then, on the basis of a predetermined sequence of the linguistic text components, to successively derive the partial information allocated to the individual linguistic text components.

24. A device according to claim 20,
wherein said means for producing partial information further comprises:
means for determining a plurality of formulation alternatives for the modified text by varying the sequence of the linguistic text components and/or by using synonyms or paraphrases for the linguistic text components, each formulation alternative being grammatically correct for the text and having substantially the same meaning as the text, with each sequence and/or each synonym or each paraphrase having specific partial information allocated thereto,
wherein said means for producing partial information is arranged to access said means for determining a plurality of formulation alternatives, in order to retrieve the partial information relating to the sequence and/or the linguistic meaning of the linguistic text components of the modified text.

25. A device according to claim 1 or 20,
wherein said means for determining formulation alternatives or said means for producing partial information is arranged to utilize a word memory in the form of a tree or graph consisting of (a) full word forms, i.e. inflected words which then are correlated to other inflected words or (b) morphologic syntactic breaking down of the words in accordance with inflection classes, and in particular splitting into word prefixes, radices and suffixes, in which only the word radices or word prefix/word radix combinations are explicitly correlated as synonyms and the respective inflected forms are analyzed in accordance with the current demand in the respective word present on the basis of inflection data, and are generated correspondingly for a selected synonym.

26. A device according to claim 25,
wherein references to synonyms are organized either as (a) chain of synonymous meanings of a word that firstly make reference to each other in ring-like manner and secondly are ordered implicitly by an order regulation, such as the lexical sequence or arrangement in accordance with the probability of occurrence, or explicitly by a characterization of the rank of one or more elements, or (b) as group of words considered to be synonymous or as references to the synonyms with the property that reference is made inversely to this group as well from the synonyms concerned or that this group is stored as value of a synonym.

27. A device according to claim 1 or 20,
wherein the means for determining formulation alternatives is adapted to have a person-specific or generally found linguistic probability of a formulation alternative which has influence on the modeled probability or partial information used for compression.

28. A device according to claim 1 or 20,
wherein the means for determining formulation alternatives is operative to identify grammatically correct formulation alternatives and thus limiting a range of choices of formulation alternatives when recursively parsing by fully respecting the dependencies through levels of the parsing process guaranteeing correctness of an entire sentence.

29. A device according to claim 1 or 20, wherein the means for determining formulation alternatives and the means for selecting are operative to recursively search a linguistic head or select a formulation alternative, wherein a number of grammatically correct formulation alternative in a subsequent step is reduced compared to an earlier step so that a cumulative probability of all formulation alternatives for that step is such that probabilities for the formulation alternatives sum up to one and so that choices made before do not lead to grammatically incorrect or improbable sentences.

30. A method for extracting information hidden in a modified text, the modified text having at least one sentence, comprising:
linguistically analyzing the modified text to produce linguistic text components of the modified text, the linguistic text components being components of the sentence and the sentence, in addition to at least one additional component, having exactly one linguistic head as component;
wherein the step of linguistically analyzing comprises parsing by recursively breaking down the sentence into the text components using a hierarchical tree structure, and by determining the predicate and remaining elements of the sentence and by recursively searching a linguistic head within the remaining elements of the sentence until the text components of the sentence are obtained,
wherein the step of parsing furthermore comprises using a dictionary/grammar stage having an entry for the predicate and the linguistic head,
wherein the means for determining is operative to use the entry for the predicate and the linguistic head to exclude parsing alternatives resulting in grammatically incorrect formulation alternatives;
producing partial information allocated to the sequence of the linguistic text components and to the linguistic meanings of the linguistic text components, with the same partial information being produced which, in hiding the information to produce the modified text, was allocated to the sequence of linguistic text components and, in case the modified text has information hidden in linguistic meanings of the linguistic text components, was allocated to the linguistic meanings of the linguistic text components;
wherein the partial information allocated to the simultaneously possible formulation alternatives for a sentence result in an overall probability of 1.0 such that arbitrary information can be hidden in the text,
wherein the step of producing comprises using, for the allocation of partial information to the simultaneously possible formulation alternatives, an existing probability distribution or a probability distribution generated in accordance with specific rules known to a device for extracting hidden information from a text, wherein the step of producing comprises to not produce partial information from a sentence when valid formulation alternatives can not be found in the step of linguistically analyzing, combining the partial information that was produced for the modified text by said step of producing partial information, in order to obtain the information hidden in the modified text; and outputting the hidden information.

\* \* \* \* \*